Figure 4:
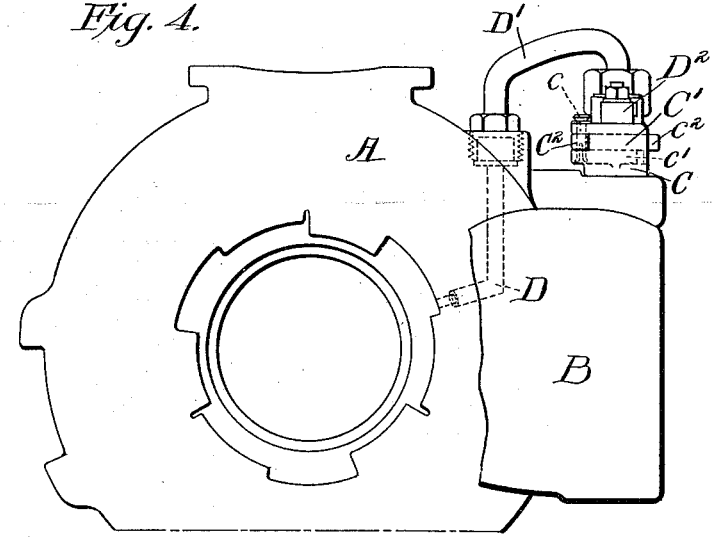

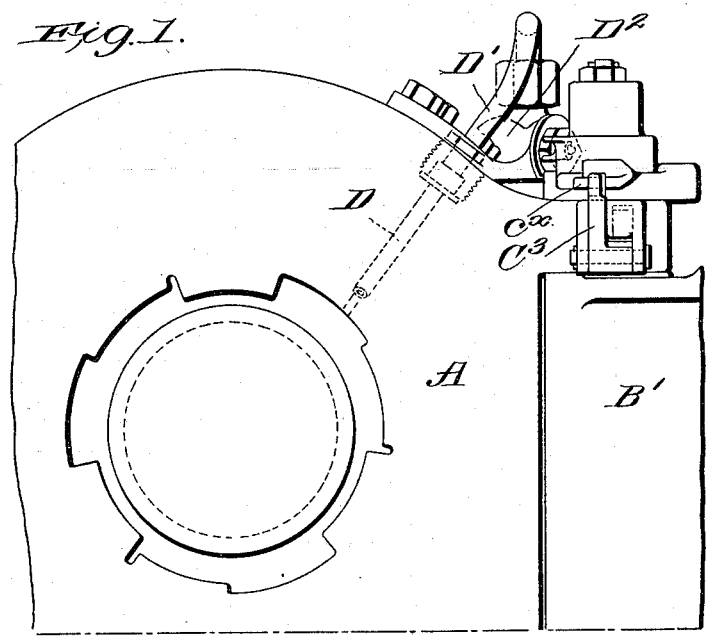
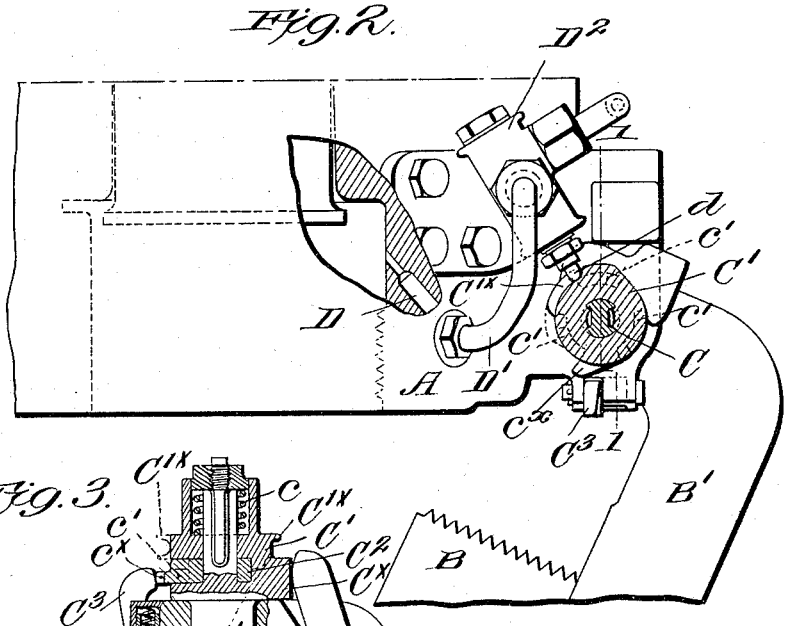

A. T. DAWSON & G. T. BUCKHAM.
BREECH LOADING ORDNANCE.
APPLICATION FILED APR. 2, 1910.

1,067,720.

Patented July 15, 1913.

3 SHEETS—SHEET 2.

Witnesses
Byron B. Collings.
W. Max. Duvall.

Inventors
A. T. Dawson &
G. T. Buckham
by Wilkinson, Fisher & Witherspoon
Attorney A. T. DAWSON & G. T. BUCKHAM.
BREECH LOADING ORDNANCE.
APPLICATION FILED APR. 2, 1910.
1,067,720.
Patented July 15, 1913.
3 SHEETS—SHEET 3.
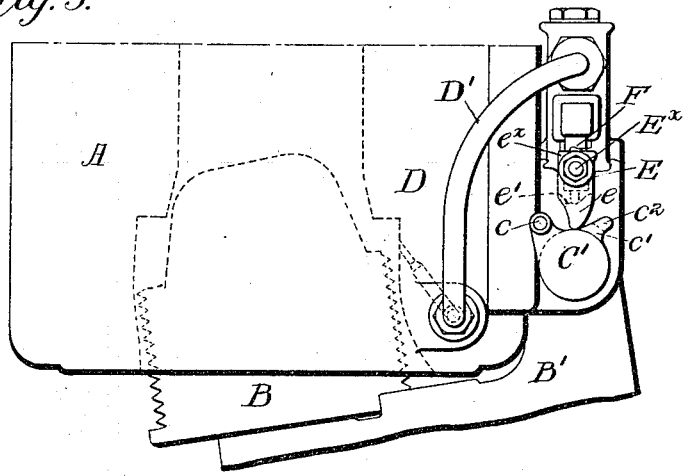
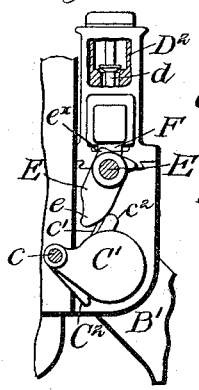 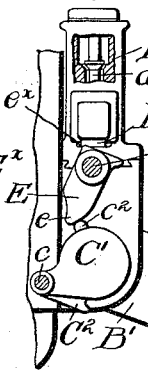 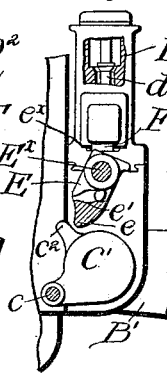 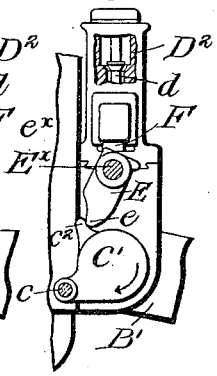
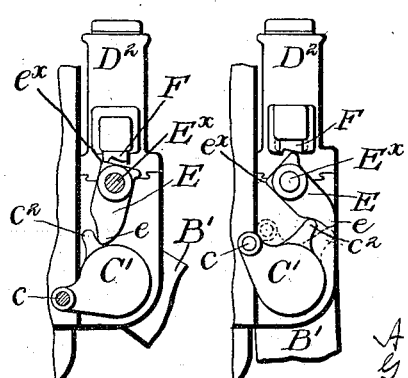

UNITED STATES PATENT OFFICE.

ARTHUR TREVOR DAWSON AND GEORGE THOMAS BUCKHAM, OF WESTMINSTER, LONDON, ENGLAND, ASSIGNORS TO JOHN J. KNAPP, TRUSTEE, OF WASHINGTON, DISTRICT OF COLUMBIA.

BREECH-LOADING ORDNANCE.

1,067,720.　　　　Specification of Letters Patent.　　Patented July 15, 1913.

Application filed April 2, 1910.　Serial No. 553,062.

*To all whom it may concern:*

Be it known that we, ARTHUR TREVOR DAWSON and GEORGE THOMAS BUCKHAM, both subjects of the King of Great Britain, residing at Westminster, London county, England, have invented certain new and useful Improvements in Breech-Loading Ordnance; and we do hereby declare the following to be a full, clear, and exact description of the invention, such as will enable others skilled in the art to which it appertains to make and use the same.

This invention relates to breech loading ordnance of the kind set forth in the specification of the prior British Patent No. 28785 of 1903, in which provision is made for injecting into the gun-breech a jet or jets of compressed air or other suitable fluid during the opening of the breech, with the object of obviating the backward rush of flame or hot gases, which is liable to occur when the gun is fired in a head wind, and also with the object of effectually clearing the bore of the gun of any combustible matter which may remain therein after firing.

The chief purpose of the present invention is to provide improved apparatus for controlling the supply of the compressed air or other fluid to the gun, the improved apparatus being characterized by simplicity of construction and control and by the fact that it does not interfere with the rapid assembling or dismantling of the mechanism.

According to our invention the valve used for controlling the supply of the compressed air or other fluid, is automatically operated by the movement of the swinging carrier through the intervention of a device actuated by the hinge bolt of the swinging carrier. The mechanism is so constructed and arranged in relation to the said valve that the supply of air or other fluid continues as long as the breech mechanism remains in the fully open position, the said valve being closed when the swinging carrier is moved a few degrees from its fully open position. The control of the supply of air is effected through the hand lever of the breech mechanism and therefore the man who operates the mechanism controls the blast and uses his discretion in shutting off the air supply by merely slightly returning the breech mechanism toward the closed position when he sees that the bore is clear. In one constructional form of our device, the said valve is actuated by means of a cam on the carrier hinge bolt, the said cam being so arranged that it causes the air control valve to commence opening as the cartridge extractor receives its ejecting impulse, and to become fully open as the cartridge case leaves the breech chamber; when the swinging carrier is moved inward a few degrees from its fully open position, the said cam moves into a position to permit the control valve to close automatically. In another constructional form of our device, the air control valve is operated by a lever pivoted to the valve casing, the said lever being actuated by a cam or the like on the upper end of the carrier hinge bolt. The said lever is so constructed that when moved in one direction by the cam (during the opening of the breech) it acts upon the stem of the control valve and opens the latter, while when moved in the other direction (in closing) it passes clear of the valve stem. The valve-actuating cam is so arranged that it permits the control valve to admit the compressed air to the breech immediately the obturator is sufficiently clear of the charge chamber.

In order that our said invention may be clearly understood and readily carried into effect we will describe the same more fully with reference to the accompanying drawings, in which:—

Figure 6:
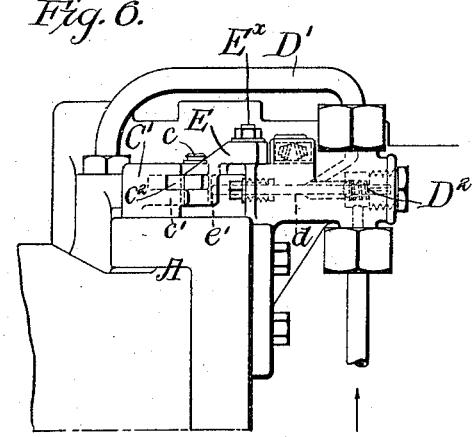
Figure 7:
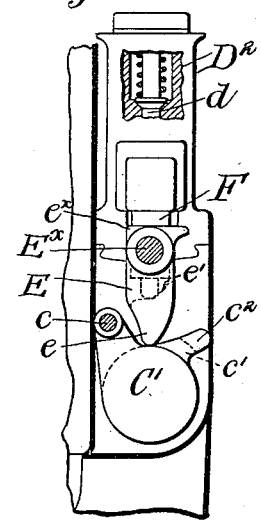
Figure 8:
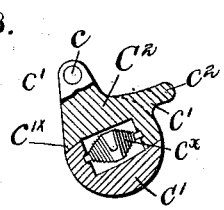

Figure 1 is an end elevation of the breech end of a gun provided with one form of our improved apparatus. Fig. 2 is a plan view partly in section of Fig. 1, and Fig. 3 is a sectional elevation on the line 1—1 of Fig. 2. Fig. 4 is an end elevation of the breech end of a gun provided with a modified form of our improved apparatus. Fig. 5 is a plan of Fig. 4, showing the parts in the position they occupy at the commencement of the opening of the control valve. Fig. 6 is a side elevation of Fig. 4. Fig. 7 is an enlarged view showing the normal position of the parts when the breech is closed. Fig. 8 is an enlarged view of the cam device, and Figs. 9 to 14 are views showing the position of the parts at various stages of the opening and closing of the breech.

In these figures A is the breech end of the gun, B is the breech screw, B′ is the swinging carrier and C is the carrier hinge bolt.

D is the passage formed in the breech end of the gun, for conducting the air or other fluid into the bore of the gun.

D' is the pipe connecting the said passage with the control valve casing D².

In the constructional form of our improved apparatus when applied to breech mechanism of the kind used with a case contained charge, as shown in Figs. 1 to 3 of the accompanying drawings, the air control valve $d$, which is of the spring controlled plunger type, is supported on the breech end of the gun, and a cam C' for operating said valve is connected to the upper end of the carrier hinge bolt C by means of a key and keyway arrangement so as to permit of the vertical movement of the said cam against the resistance of a spring $c$. An interrupted lifting ring C² is situated between the head C$^x$ of the carrier hinge bolt C and the aforesaid valve-actuating cam C'. The said ring C² has inclined segmental portions $c'$ engaging with corresponding portions formed on the upper side of the hinge bolt head C$^x$ and on the under side of the valve-actuating cam C'. A spring-controlled lever C³ engages with a radial arm $c^x$ on the said lifting ring C² when the breech mechanism is fully open. As the breech screw is being swung out of the gun in opening the breech, the valve-actuating cam C' rotates with the carrier hinge bolt C and at the proper moment moves the valve stem $d$ longitudinally and thus opens the control valve to admit the compressed air to the gun. During this action the lifting ring C² also rotates with the hinge bolt C and the arm $c^x$ on the said ring, being beveled on one side, displaces the spring controlled lever C³. As soon as the breech screw is fully swung into the open position, the said arm $c^x$ clears the aforesaid spring controlled lever C³, which then immediately returns to its normal position under the influence of its spring. The said lever C³ then lies in engagement with the opposite side of the said arm $c^x$ on the lifting ring C². On commencing to return the breech screw to the closed position, the inclined portions on the hinge bolt C and the cam C' move along the inclines $c'$ on the lifting ring C² owing to the fact that the latter is prevented from rotating by the spring controlled lever C³; the cam C' and the lifting ring C² therefore rise. As soon as the cam C' rises sufficiently to become disengaged from the valve stem $d$ the latter closes under the influence of its spring. At the same time the lifting ring C² rises sufficiently to clear the said spring controlled lever C³, over the end of which it therefore passes. During the further rotation of the carrier hinge pin C in closing the breech, a flange C'$^x$ rests laterally against the control valve stem $d$, and the cam C' is thus prevented from assuming its normal position. When the breech is closed, a gap in the said flange C'$^x$ registers with the valve stem and enables the cam C' to return to its normal position under the influence of its spring $c$.

In the constructional form of our improved apparatus when applied to breech mechanism of the kind in which an obturator is employed, as illustrated in Figs. 4 to 14 of the accompanying drawings, the air control valve is operated by a valve lever E pivoted at E$^x$ to the valve casing D², the said lever being actuated by a cam arrangement or the like on the upper end of the carrier hinge bolt C. The said cam arrangement comprises two cams C' and C² of which the former is on the carrier hinge bolt, while the latter, which acts as a tripping cam, is pivotally connected to the cam C' by means of a pivot pin $c$, the tripping cam C² being disposed in a recess formed in the part C'. The said recess is formed with its rear wall as a curve struck from the pivot pin $c$ as a center, and is provided with a beveled portion $c'^x$ (Fig. 8) adapted to engage with a similar surface on the tripping cam C² to prevent movement of the cam C' in a rearward direction. In the aforesaid recess is a spiral compression spring $c^x$, the ends of which are in contact with the cams C' and C². The said cams are provided with cam surfaces $c'$ and $c^2$ respectively both of which are normally in engagement with the toe $e$ of the aforesaid valve lever E. The said lever has a cam surface $e'$ against which the rounded end of the spring controlled valve spindle $d$ bears, the said cam surface $e'$ actuating the said valve spindle as the lever E is rocked about its pivot E$^x$ when the breech is opened. A spring plunger F bears upon the forward portion of the lever E and tends to normally keep the same in the position shown in Fig. 7. A heel $e^x$ on the lever E is adapted to engage in a notch formed in the face of the said spring plunger as shown in Figs. 9, 10, 11 and 12, in which position the cam surface $e'$ of the lever E holds the valve $d$ in the open position.

During the outward movement of the swinging carrier in opening the breech the cam surface $c'$ of the cam C' acts upon the toe $e$ of the lever E to displace the same against the resistance of the spring plunger F from the position shown in Fig. 7 to that shown in Fig. 5. Further displacement of the swinging carrier causes the parts to assume the position shown in Fig. 9 when the valve $d$ is fully open and the valve lever E is retained in position by means of the engagement of the heel $e^x$ in the notch of the spring plunger F. The tripping cam C² has during this operation been displaced by the lever E and the cam surface $c^2$ into the position shown in Fig. 10. Further movement of the swinging carrier in the direction of the arrow will carry the cam surface $c^2$ of the tripping cam $C^2$ out of contact with the valve lever E, and the said cam will therefore, under the influence of its spring $c^x$, assume its original position in relation to the cam C' as shown in Fig. 11. Movement of the swinging carrier to close the breech, i. e. in the direction shown by the arrow in Fig. 12 will then cause the cam portion $c^2$ of the tripping cam $C^2$ to engage with the toe $e$ of the valve lever E, which results in the heel $e^x$ of the said lever being moved out of engagement with its notch, the tripping cam $C^2$ being prevented from movement in the reverse direction by means of the beveled surface $c'^x$ as aforesaid. As soon as the heel $e^x$ is moved out of the said notch the spring controlled plunger F causes the lever E and the valve $d$ to resume their normal position. If now the swinging carrier were again moved to the fully open position, it is obvious that the valve lever E and consequently the valve $d$ would not be operated. Fig. 14 illustrates the position of the parts when the breech is nearly closed, showing the valve lever E rocked in the reverse direction against the resistance of the spring plunger F. The cam surface $e'$ is so arranged that no motion is imparted to the valve spindle $d$ during this movement. The dotted lines in Fig. 14 show the position that the cam surface $c^2$ occupies when the breech is completely closed, in which position the valve lever E under the influence of the spring plunger F, returns to the normal position illustrated in Fig. 7.

We claim:—

1. The combination with a gun having a breech closure, and a hinge bolt on which said closure is mounted; of means for directing a blast of air into the gun breech; a valve for regulating said air blast; a projecting member on said valve; and a projecting member on the hinge bolt of the closure operable to engage with the projecting member of the valve and effect the opening of said valve when the closure is opening and means to release the valve to close when the closure is closing, substantially as described.

2. The combination with a gun having a hinged breech closure; of means for directing a blast of air into the gun breech; a valve for regulating said air blast; a stem on said valve; a cam on the hinge of the closure having inclined portions and adapted to engage with said valve stem and open the valve when the closure is opened; said cam mounted to rotate with and have axial movement on said hinge; a member on said hinge adapted to coöperate with said cam; and a stop coöperable with said member for effecting the release of said valve from the cam when the closure is closing, substantially as described.

3. The combination with a gun having a hinged breech closure; of means for directing a blast of air into the gun breech; a valve for regulating said air blast; a stem on said valve; a cam and a ring mounted to rotate with and have axial movement on the hinge of the closure and each having inclined portions; said cam adapted to engage with the valve stem and open the valve when the closure is opened; a spring holding said cam ring in engagement; and a stop member adapted to engage the ring and effect the release of said cam and valve stem to close said valve when the closure is closing, substantially as described.

4. The combination with a gun having a hinged breech closure; of means for directing a blast of air into the gun breech; a valve for regulating said air blast; a stem on said valve; a cam mounted to rotate with and have axial movement on the hinge of the closure and having inclined portions; a head on said hinge having inclined portions; a ring having inclined portions mounted intermediate said head and cam; a spring on the hinge holding the inclined portions of said cam, ring and head in contact; said cam adapted to engage with the valve stem and open the valve when the closure is opened; and a stop member adapted to engage with said ring and effect to raise the cam and release the valve stem when the closure is closing, substantially as described.

In testimony whereof, we affix our signatures, in presence of two witnesses.

ARTHUR TREVOR DAWSON.
GEORGE THOMAS BUCKHAM.

Witnesses:
HENRY KING,
ALFRED PEAKS.